United States Patent
Carbonniere

[11] 3,876,810
[45] Apr. 8, 1975

[54] KELP DERIVED FEEDS CONTAINING SEQUESTERED TRACE MINERALS

[75] Inventor: John G. Carbonniere, Gardena, Calif.

[73] Assignee: Ocean Labs Inc., San Pedro, Calif.

[22] Filed: Sept. 24, 1970

[21] Appl. No.: 75,213

[52] U.S. Cl. .............. 426/74; 426/210; 426/220; 426/271; 426/807
[51] Int. Cl. ............................................ A23k 1/175
[58] Field of Search ...... 99/2, 14, 2 R, 2 LD, 2 ND; 47/1.4; 426/74, 210, 218, 220, 271, 807

[56] References Cited
UNITED STATES PATENTS

| 2,725,677 | 12/1955 | Myers | 47/1.4 |
|---|---|---|---|
| 2,960,406 | 11/1960 | Cardon | 99/2 |
| 3,396,104 | 8/1968 | Miller | 99/2 |
| 3,403,471 | 10/1968 | Clement | 47/1.4 |

OTHER PUBLICATIONS

Scientific American, Weiss, Vol. 187, No. 6, December 1952, page 15, 16 and 17.
Algal Culture by Burlew, Carnegie Inst. of Washington Publication 600, 1953, pages 90, 92, 94, 95, 98, 100, 101, 214, 215, 217, 218.

Primary Examiner—Norman Yudkoff
Assistant Examiner—Curtis P. Ribando
Attorney, Agent, or Firm—White and Haefliger

[57] ABSTRACT

A water soluble feed product derived from freshly harvested kelp is produced in ground dehydrated form to contain sequestered trace minerals of the group consisting of zinc, manganese, iron, copper, cobalt and iodine together with kelp contents of sodium, potassium, magnesium, sulfur, and vitamins.

6 Claims, 2 Drawing Figures

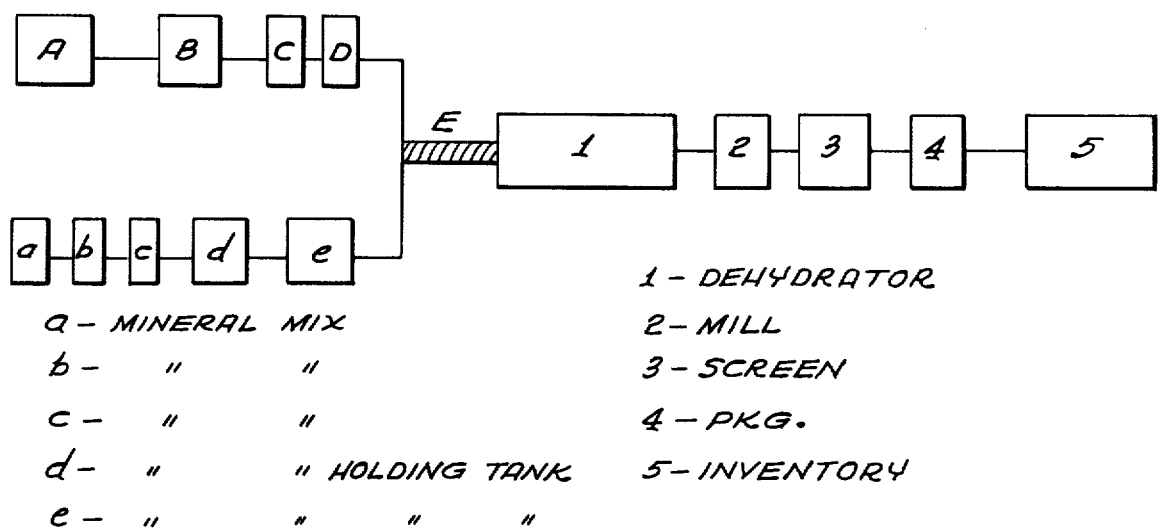
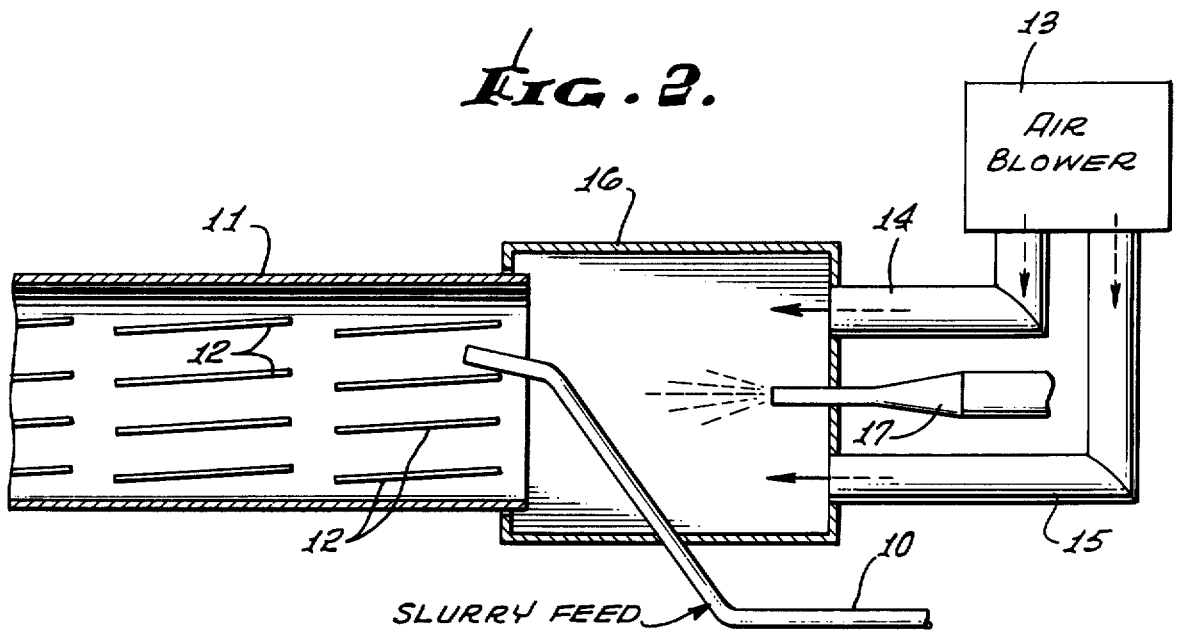

KELP DERIVED FEEDS CONTAINING SEQUESTERED TRACE MINERALS

SUMMARY OF THE INVENTION

This invention relates to feeds produced from freshly cut raw Macrocystis pyrifera (giant brown kelp), typically as harvested from Pacific ocean waters, the specific compositions of which may vary depending upon particular ocean sources, e.g. Pacific vs. Atlantic. Hereinafter this specie will be referred to simply as kelp.

The invention has for its general object to produce a kelp-derived product containing added trace minerals which, along with natural values in the kelp, become sequestered in the product by reason of certain peculiar properties of the kelp. The latter contains a high level of polysaccharides by virtue of which, along with other components of the kelp, give the latter unique properties for the sequestration and stabilization of natural and added trace mineral values productive of high quality feeds for consumption as by ruminants, swine and poultry.

Procedurally the product results from converting rapidly the freshly cut kelp (which ferments readily and therefore loses effectiveness), into slurry of pulp or paste-like consistency, adding to the slurry trade mineral sources, and dehydrating and grinding the resulting mixture.

Trace minerals are prepared by the addition of water soluble sulfates of the group consisting of zinc sulfate, manganese sulfate, ferrous sulfate, copper sulfate, cobalt sulfate and ethylene diamine dihydriodide (as iodine source) in quantities and proportions subject to variation according to the desired trace mineral content in the end product. That content may take into consideration components of the kelp itself such as potassium chloride, sodium chloride, magnesium sulfate, iodine and added or natural vitamins. The mineral solution is introduced to the kelp slurry in the proper predetermined proportions, uniformly mixed and then fed into a suitable dehydrator, preferably under conditions of controlled flow, heat and time.

When adequate moisture has been removed the product which is in small flake form as removed from the dehydrator, is passed through a mill or grinder and then screened and bagged. The product can be made available in regular and extra fine grinds, the latter being useable to advantage in liquid application because it will readily go into and remain in suspension.

The product is characterized by virtue of its polysaccharide content in its capacity to surround and isolate the metallic ions. Sequestration and derivation of added mineral elements and iodine results from reaction of the ionized mineral sulfate salts and ethylene diamine dihydriodide (EDDI) with the polysaccharides in the kelp. The water soluble product having a pH in water solution in the range of about 3.5 to 5.0, releases its metallic ions when digested by enzymatic action or exposure to the level of acidity existing in the consuming animal or fowl. The sequestering process appears to be physical rather than chemical in that the inorganic metallic cations and even the anions in the trace minerals are separated in their consumable condition.

Analysis of the product may vary widely as to mineral content so long as the kelp content is sufficient to sequester the total minerals added. Minimum kelp content may range from as low as about 15%, e.g. as in a swine formulation, with the kelp content for e.g. ruminant formulas, ranging as high as 85%.

The details of an illustrative method for making the product will be explained by reference to the accompanying drawing.

BRIEF DESCRIPTION OF THE DRAWING

FIG. 1 is a diagrammatic illustration of the process in flow sheet form; and

FIG. 2 is a fragmentary sectional enlargement showing an illustrative dehydrator system.

In reference first to FIG. 1, the freshly harvested kelp enters the system at tank A from which, with or without the addition of water, the kelp passes successively through chopper B and mill C both of which may be of any suitable or conventional type. The resulting slurry enters holding tank D from which the slurry flows to a suitable blender E for admixture with the mineral sulfate mixture.

The latter is prepared by the formation in any suitable sequences of dilute aqueous sulfate solutions with ethylene diamine dihydriodide in mixers $a$, $b$ and $c$ followed by delivery of the combined sulfate solutions to holding tanks $d$ and $e$ from which the mineral solution passes to the blender E for intimate and uniform mixing with the kelp slurry.

The admixture then enters the dehydrator 1 wherein its moisture content is reduced to a predetermined amount generally in the range of 10 to 4 weight percent of the final product, and as a specific example to about 8% moisture content. Broadly contemplated is the use of any suitable dehydrator, typically as depicted in FIG. 2. Here the slurry feed is shown to be introduced through line 10 into a revolving tube or drum 11 equipped with lifting fins 12 to maintain the slurry in a state of agitation and exposure as it undergoes progressive dehydration. Air is supplied from blower 13 through ducts 14 and 15 into chamber 16 receiving combustible gas from jet 17 so that the entering air and combustion gases are premixed to a temperature of about 300°–350°F before entering the dehydrator drum 11 and prior to admixture with the slurry being discharged into the drum from line 12. The dehydrator may have any suitable known means for separately withdrawing the hot and heated gas and air mixture from the discharge and of the drum and for passage of the dehydrated product to suitable disintegration means such as successively a grinding mill 2, screening facility 3 and packaging stage 4 from which the screened product or products goes to inventory 5.

The selection and proportion of the added elements may vary and somewhat widely depending upon the intended use of the feed product. Thus the individual element contents expressed as mineral elements in the product may range within about the following limits:

| zinc | 20 | to | 0 | percent |
| manganese | 15 | to | 0 | percent |
| iron | 12 | to | 0 | percent |
| copper | 13 | to | 0 | percent |
| cobalt | 12 | to | 0 | percent |
| iodine | .5 | to | 0 | percent |

In general the product will contain all of the elements within the percentage ranges indicated, although if for any reason desired in particular feeds some but not necessarily all of the added elements may be present in the product.

The dehydrated product normally will contain also the following:

| | | | | |
|---|---|---|---|---|
| potassium | 7.0 | to | 2.0 | percent |
| sodium | 4.0 | to | .5 | percent |
| sulfur | 12.0 | to | 3.0 | percent |
| salt (NaCl) | 21.0 | to | 4.0 | percent |

The following study was performed to show solubility of the sequestered elements. Samples of the dehydrated product were taken, leached with water and then filtered. The samples investigated show solubilities ranging from a low of 98.7% to a high of 99.3%, thus demonstrating that solubility has been retained without the formation of insoluble complexed chemical entities.

Since the sequestering process is basically a very complex and undefinable phenomena, I will show through chemical data that the product exists as described. Three liquid trace mineral supplements were produced in the laboratory to simulate actual conditions. Number one contained trace minerals supplied as previously described; in number two the trace minerals supplied through the mineral sulfates; and the third was supplied through ethylene diamine tetra acetate (EDTA) chelated trace minerals. Then a chemistry procedure was developed to extract the soluble and available elements. The element thoroughly studied was iron since iron is one of the hardest of all the trace elements to retain without forming insoluble complexes.

DATA SUBMITTED TO SHOW THE RESULTS

Liquid Supplements
Trace element source as in present product

| Water Base | | No. 1 % | No. 2 % | No. 3 % |
|---|---|---|---|---|
| Water distilled | | 85.909 | 85.875 | 85.875 |
| Phosphoric acid | | 2.657 | 2.657 | 2.657 |
| Salt | | 8.319 | 8.319 | 8.319 |
| Urea | | 2.917 | 2.917 | 2.917 |
| Vitamin A, 400,000 USP u./g. | | .032 | .032 | .032 |
| Trace Minerals - | EDDI* | | .200 | |
| | Sulfates** | .166 | | |
| | As in product*** | | | .200 |
| | | 100.000 | 100.000 | 100.000 |

Chelated trace mineral reacted with citrate-EDTA reagent made as follows:

| | |
|---|---|
| Ammonia Citrate | 200 g. |
| Disodium EDTA | 50 g. |
| Distilled water | 1000 mls |

| Mineral formula | | Compound | Element |
|---|---|---|---|
| Iron sulfate | | 16.9% | 3.38% |
| Zinc sulfate | | 44.4 | 15.98 |
| Manganese sulfate | 15.0 | 11.2 | 7.20 |
| Ethylene diamine Dehydriodide | | 2.8 | 2.24 |
| Copper sulfate | | 6.9 | 1.73 |
| Cobalt sulfate | | 2  .8 | .59 |
| | | 100.0 | |

**The sulfate salts of the trace minerals same sulfate formula as above. Added on a 1/5 dry sulfate mineral basis.

Mineral element formula

| Element | |
|---|---|
| Iron | 1.28 |
| Zinc | 3.20 |
| Manganese | 2.24 |
| Iodine | .45 |
| Copper | .35 |
| Cobalt | .12 |

***Product formula

| Element | |
|---|---|
| Iron | 1.78 |
| Zinc | 9.00 |
| Manganese | 9.50 |
| Iodine | .15 |
| Copper | .32 |
| Cobalt | .14 |

The liquid supplements were compounded and allowed to stand for 8 days at room temperature. Then the chemical analysis was begun. The chemical procedures employed were kept as simple as possible since the trace minerals employed were all completely water soluble. The samples were all analyzed for Iron because of its ability to form insoluble complexes.

Method

The samples were extracted with Ammonium Acetate 1.0 N at 4.8 pH. The ortho phenanthroline technique for the determination of iron was essentially employed. Detailed information about this method is given by Fortune and Mellon (1938), Bandemer and Schaible (1944).

Reagents

1. Ammonium Acetate 1 N pH 4.8
2. Orthophenanthroline Reagent
3. Hydroxylamine Hydrochloride 10%

Procedure 1.0 ml of each liquid supplement was taken and placed in separate 1 liter volumetric flasks and diluted to vol. with distilled water. Then 10 ml are taken into a stopper flask to which 50 mls of Ammonium Acetate are added and agitated for a half hour. The material is then filtered through a whalman No. 41 filter. A 10 ml portion of each extracted sample is taken and placed into each of two photometric tubes plus a third tube into which is placed 10 ml of distilled water. Each original sample will then have 3 photometric tubes. To the first tube of each sample add 2 mls of Hydroxylamine hydrochloride and 2 mls of O phenanthroline. To the second tube add 2 mls of Hydroxylamine hydrochloride and 2 mls of distilled water. To the third tube add 2 mls of Hydroxylamine hydrochloride and 2 mls of O phenanthroline. Allow 15 minutes for the reddish color to develop and read in filter photometer using 510 m$\mu$ wave length filter.

Results

TABLE 1

| | Sulfates Sup No. 1 | | | Fe Content EDTA Sup No. 2 | | | Sea-Questra-Min Sup No. 3 | | |
|---|---|---|---|---|---|---|---|---|---|
| | Reading | Content % Found | Actual | Reading | Content % Found | Actual | Reading | Content % Found | Actual |
| Tube No. 1 | 69 | 1.63 | 3.38 | | | | | | |
| Tube No. 2 | | | | 71 | 1.27 | 1.28 | | | |
| Tube No. 3 | | | | | | | 63 | 1.69 | 1.72 |

The data shows that the supplement having the sulfate mineral has apparently lost the solubility of the free sulfate elements through insoluble complexes that could not be extracted by Ammonium Acetate. On the other hand both the EDTA Supplements No. 2 and the present product supplement No. 3 showed complete recovery.

This indicates that even though the raw materials for my product production are initially sulfates, mineral salts, a change has transpired to render these as sequestered chemically as the EDTA chelates. It appears therefore that this is brought about by the polysaccharides contained in the water soluble portion of the giant sea kelp.

In addition to the above data a study was conducted to show the extreme solubility of the present product.

Procedure

Four 2 g. dried samples were dissolved in 250 mls of distilled water and filtered. The filter paper was previously dried and weighed. The results are shown in Table 2. The extreme solubility of the mineral components is apparent.

TABLE 2

Solubility Study 2.00 gm samples taken

| | Weight Sample | Weight filler Paper | Dried Weight | Weight lost Solubles | % Sol | %* Carrier | % Insol |
|---|---|---|---|---|---|---|---|
| 1. | 2.0 | .500 | .8061 | 1.6939 | 84.7 | 14% | 1.3% |
| 2. | 2.0 | .542 | .8355 | 1.7065 | 85.3 | 14% | .7% |
| 3. | 2.0 | .505 | .8120 | 1.6930 | 84.7 | 14% | 1.3% |
| 4. | 2.0 | .552 | .8555 | 1.6965 | 84.8 | 14% | 1.2% |

*Carrier represents the insoluble fibrous portion of the sea kelp used in processing.

Bibliography

Fortune, W. B. and Mellon, M. G. 1938
   Determination of Iron with o-phenanthroline. Ind. Eng. Chem. Anal Ed. 10:60–64

Bandemer, S. L. and Schiable, R. J. 1944
   Determination of Iron. A study of the o-phenanthroline method. Ind. Eng. Chem. Anal Ed. 16:317–319

As previously indicated the product is found to have outstanding nutrient values by reason of the property of the kelp to sequester and maintain in stabilized condition all of these added trace elements as well as values including natural or added vitamins present in the kelp itself. The sequestration appears to result in some if not substantially complete deionization of the sulfates and ethylene diamine dihydriodide with the cations held sequestered until they can become nutritionally effective when digested by enzymic action or the acidity in the digestive environment of the consuming animal or fowl.

The product in most practical useages is an additive or supplement to conventional animal or fowl feeds, to be used in variable proportions by weight ranging from about 0.007% to 0.05% of the feed.

The following are illustrative examples prepared in accordance with the invention respectively for ruminants, poultry, and swine, in which the analyses are expressed for the most part in terms of the sequestered trace minerals.

EXAMPLE 1

Sequestered Trace Minerals for Ruminants
Analysis

| | | |
|---|---|---|
| Potassium (K) | about | 7.00% |
| Sodium (Na) | about | 3.10% |
| Zinc (Zn) | about | 3.20% |
| Manganese (Mn) | about | 2.30% |
| Iron (fe) | about | 1.72% |
| Copper (cu) | about | 0.63% |
| Magnesium (Mg) | about | 0.56% |
| Sulfur (S) | about | 4.00% |
| Iodine (I) | about | 0.45% |
| Cobalt (Co) | about | 0.40% |
| Salt (NaCl) | about | 17.00% |
| Salt (NaCl) (Chlorine expressed as NaCl) | about | 21.00% |

Ingredients

Dehydrated kelp (Macrocystis pyrifera), Zinc Sulfate, Mangnaese Sulfate, Ferrous Sulfate, Copper Sulfate, Ethylene Diamine dihydriodide, Cobalt Sulfate.

Feeding Directions

Beef Cattle — Use in the proportion of 0.01% of finished feed.

Dairy Cattle — Use in the proportion of 0.025% to 0.05% of finished feed.

EXAMPLE II

Sequestered Trace Minerals for Poultry
Analysis

| | | |
|---|---|---|
| Potassium (K) | about | 2.00% |
| Sodium (Na) | about | 0.77% |
| Zinc (Zn) | about | 6.00% |
| Manganese (Mn) | about | 12.65% |
| Iron (Fe) | about | 0.96% |
| Copper (Cu) | about | 0.23% |
| Magnesium (Mg) | about | 0.18% |
| Sulfur (S) | about | 10.80% |
| Iodine (I) | about | 0.15% |
| Cobalt (Co) | about | 0.14% |
| Salt (NaCl) | about | 5.60% |
| Salt (NaCl) | about | 7.00% |
| (Chlorine expressed as NaCl) | | |

Ingredients

Dehydrated kelp (Macrocystis pyrifera), Zinc Sulfate, Mangnanese Sulfate, Ferrous Sulfate, Copper Sulfate, Ethylene Diamine dihydriodide, Cobalt Sulfate.

Feeding Directions

Poultry — Use in the proportion of 0.03% of finished feed. Use in the proportion of 0.6 lbs/ton of finished feed.

EXAMPLE III

Sequestered Trace Minerals for Swine
Analysis

| | | |
|---|---|---|
| Potassium (K) | about | 2.36% |
| Sodium (Na) | about | 0.77% |
| Zinc (Zn) | about | 8.20% |
| Manganese (Mn) | about | 9.50% |
| Iron (Fe) | about | 1.78% |
| Copper (Cu) | about | 0.32% |
| Magnesium (Mg) | about | 0.18% |
| Sulfur (S) | about | 10.80% |
| Iodine (I) | about | 0.15% |
| Cobalt (Co) | about | 0.14% |
| Salt (NaCl) | about | 5.60% |
| Salt (NaCl) | about | 7.00 |
| (Chlorine expressed as NaCl) | | |

Ingredients

Dehydrated kelp (Macrocystis pyrifera), Zinc Sulfate, Manganese Sulfate, Ferrous Sulfate, Copper Sulfate, Ethylene Diamine dihydriodide, Cobalt Sulfate.

Feeding Directions

Swine — Use in the proportion of 0.03% of finished feed. Use in the proportion of 0.6 lbs/ton of finished feed.

I claim:

1. Water dispersible feed product comprising dehydrated ground kelp containing added water soluble sequestered trace minerals of the group consisting of zinc, manganese, iron, copper and cobalt, said trace minerals being present in the product by the cation association of ionized sulfate salts of the minerals with polysaccharides in the kelp.

2. Feed product according to claim 1 in which the product contains also iodine.

3. Feed product according to claim 1 in which the dehydrated product contains about 4 to 10 weight percent moisture.

4. Feed product according to claim 1 in which all the named elements are contained in the product.

5. Feed product according to claim 1 in which said trace minerals are derived by cation association of ionized sulfate salts of the minerals and ethylene diamine dihydroxyiodide with polysaccharides in the kelp.

6. Feed product according to claim 1 added to a conventional ruminant, swine or poultry feed in a proportion of about 0.007 to 0.05 percent of the supplemented feed.

* * * * *